United States Patent
Freeman

[11] 3,886,919
[45] June 3, 1975

[54] LIQUID FUEL GASIFIER

[76] Inventor: Allen M. Freeman, 4133 Moriah Way, North Highlands, Calif. 95660

[22] Filed: Aug. 8, 1973

[21] Appl. No.: 386,547

[52] U.S. Cl.......... 123/133; 123/122 R; 123/122 E; 123/122 AB; 123/122 G
[51] Int. Cl. ............................................ F02m 17/18
[58] Field of Search...... 123/122 R, 122 E, 122 AB, 123/122 G, 133; 261/50 R, 141; 165/52

[56] References Cited
UNITED STATES PATENTS

| | | | |
|---|---|---|---|
| 913,121 | 2/1909 | Frayer | 261/50 R |
| 1,060,042 | 4/1913 | Wales | 123/133 |
| 1,126,218 | 1/1915 | Howe | 261/50 R |
| 1,603,660 | 10/1926 | Cassella | 123/133 |
| 2,119,885 | 6/1938 | Moore | 261/50 R |

FOREIGN PATENTS OR APPLICATIONS

| | | | |
|---|---|---|---|
| 508,215 | 6/1939 | United Kingdom | 261/50 R |
| 450,507 | 7/1936 | United Kingdom | 123/133 |

*Primary Examiner*—Charles J. Myhre
*Assistant Examiner*—R. H. Lazaus
*Attorney, Agent, or Firm*—Blair & Brown

[57] ABSTRACT

A liquid fuel gasifier in which the liquid fuel is heated by contact with an exhaust gas heat exchanger converting the liquid fuel to a gas. The gasified liquid fuel is then mixed with air prior to entering the engine. In one form of the device water is mixed with the gasified fuel air mixture prior to entering the engine to increase the octane rating.

2 Claims, 10 Drawing Figures

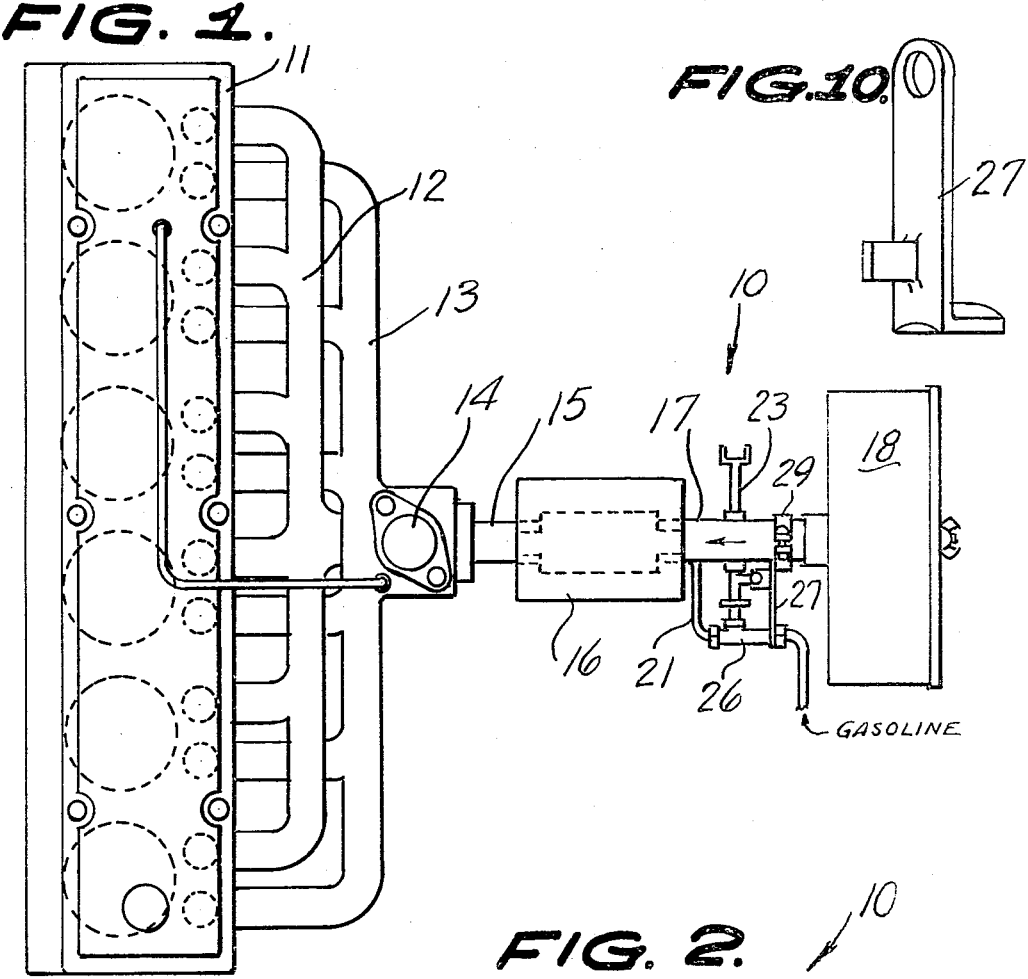
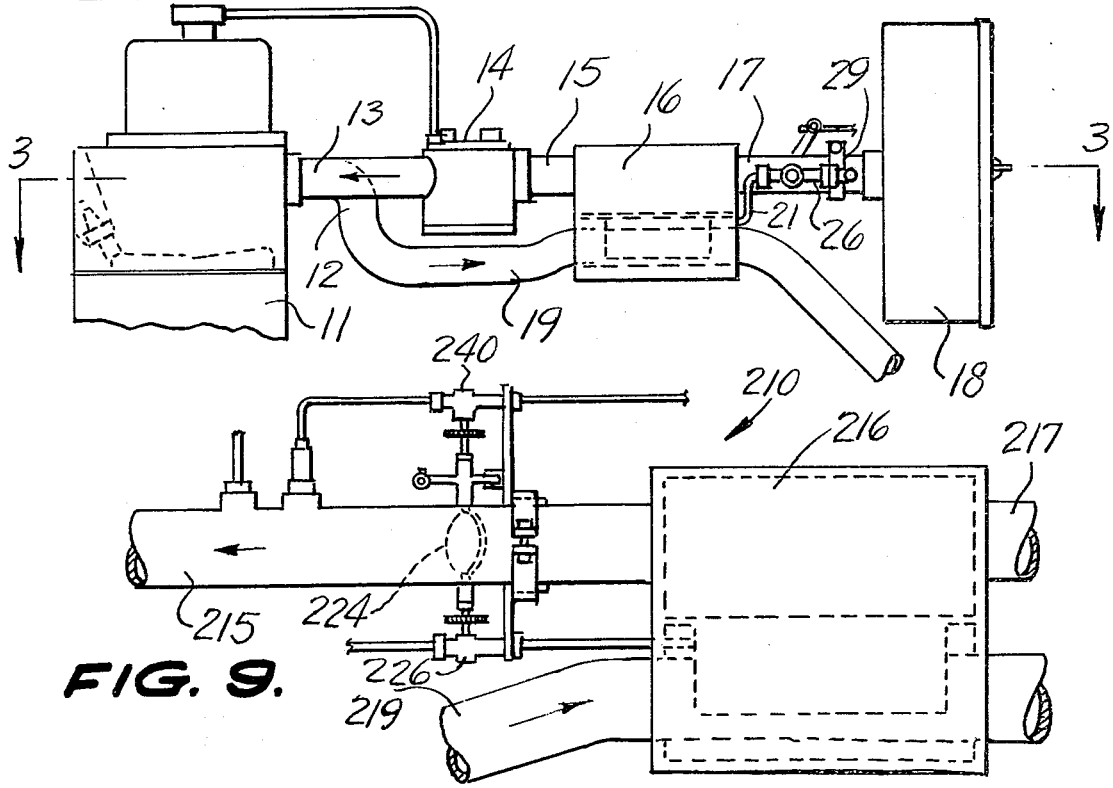

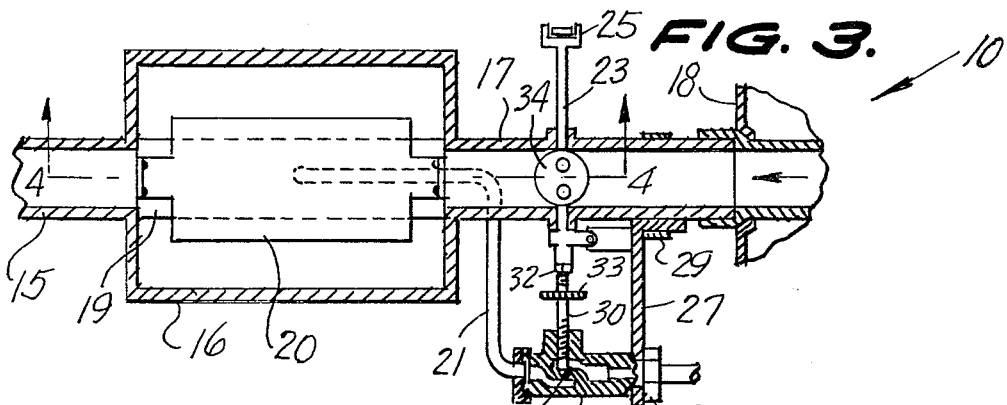
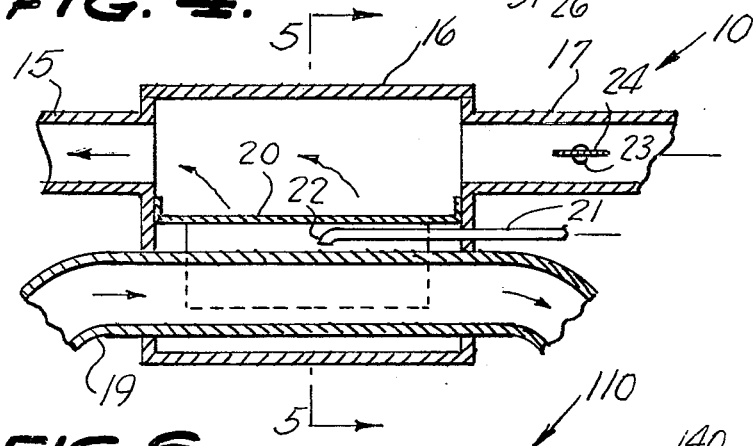
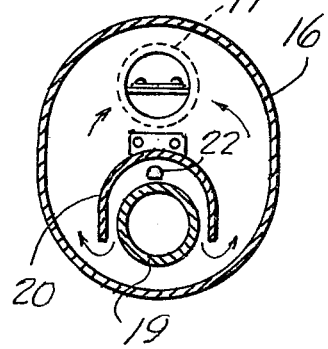
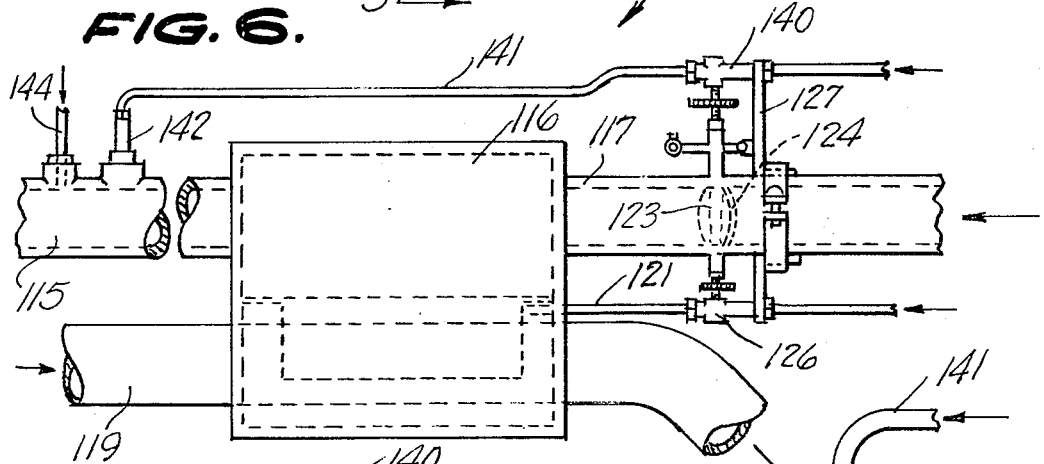
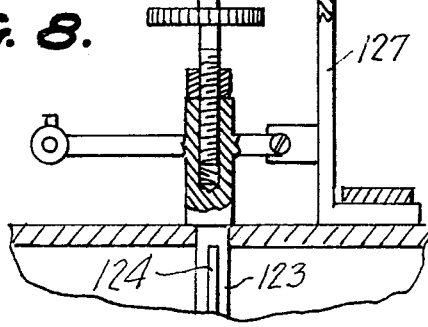
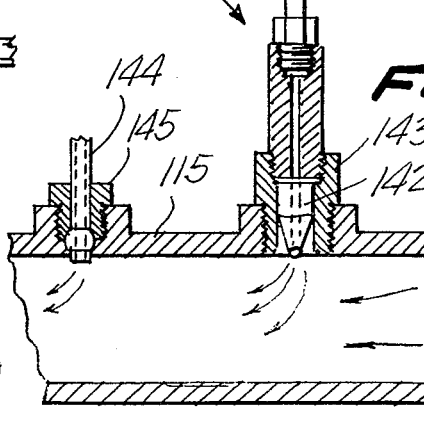

3,886,919

LIQUID FUEL GASIFIER

BACKGROUND OF THE INVENTION

1. Field of the Invention

The present invention relates to fuel systems for internal combustion engines in which the liquid gasoline is gasified by heat prior to mixing with air.

2. Summary of the Invention

The liquid fuel gasifier of the present invention includes an exhaust heated heat exchanger for converting the liquid fuel into a gas with the gas then being mixed with air or air and water prior to entering the engine.

The primary object of the invention is to provide a liquid fuel gasifier which produces gaseous fuel for mixture with air to operate an internal combustion engine.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention;

FIG. 3 is an enlarged fragmentary horizontal sectional view, taken on the line 3—3 of FIG. 2, looking in the direction of the arrows;

FIG. 4 is a vertical sectional view, taken along the line 4—4 of FIG. 3, looking in the direction of the arrows;

FIG. 5 is a transverse sectional view, taken along the line 5—5 of FIG. 4, looking in the direction of the arrows;

FIG. 6 is a fragmentary side elevation of a modified form of the invention shown partially broken away and in section for convenience of illustration;

FIG. 7 is an enlarged sectional view of the waterjet connection to the fuel line and the vacuum connection thereto;

FIG. 8 is an enlarged detailed sectional view of the metering fuel valve used with the invention;

FIG. 9 is a fragmentary side elevation of another modified form of the invention; and FIG. 10 is a perspective view of one of the brackets used with the invention.

DESCRIPTION OF THE PREFERRED EMBODIMENT

Referring now to the drawings in detail, wherein like reference characters indicate like parts throughout the several figures, the reference numeral 10 indicates generally a fuel gasifier system constructed in accordance with the invention.

The fuel gasifier system 10 is used with an internal combustion engine 11 of generally conventional construction and including an exhaust manifold 12 and an intake manifold 13. A cap 14 covers the usual carburator base foundation and a conduit 15 is connected to the intake manifold 13 along one side thereof. A chamber 16 is substantially larger than the conduit 15, is integrally connected thereto and has a conduit 17 extending outwardly from the opposite side thereof in axial alignment with the conduit 15. A conventional air filter 18 is detachably connected to the open end of the conduit 17 to filter air passing therethrough. An exhaust pipe 19 extends from the exhaust manifold 12 through the chamber 16 and onto the exhaust system of the motor vehicle. The exhaust pipe 19 is sealed to the chamber 16 to prevent any leakage therebetween.

A generally U-shaped baffle 20 is positioned in the chamber 16 overlying the exhaust pipe 19. A liquid fuel pipe 21 extends into the chamber 16 between the baffle 20 and the exhaust pipe 19 and has a hollow tube 22 on its inner end. Fuel is directed onto the hot exhaust pipe 19 by the tube 22 and is maintained in contact therewith by the baffle 20 until it gasifies and passes to the upper portion of the chamber 16 where it is entrained in air passing inwardly from the conduit 17 through the chamber 16 and out through the conduit 15. The baffle 20 concentrates the heat on the fuel and protects the incoming air from the heat.

A throttle valve shaft 23 extends through the conduit 17 and has a circular valve plate 24 secured thereto within the conduit 17 and adapted to close the conduit 17 upon rotation of the shaft 23. A yoke 25 formed on the outer end of the shaft 23 is conventionally connected to an accelerater pedal linkage for controlling the flow of air to the engine 11. A gasoline metering valve 26 is mounted on a bracket 27 by means of a nut 28 and the bracket 27 is secured to the conduit 17 by a clamp 29. A valve stem 30 is threaded into the valve 26 and is connected to the shaft 23 to rotate therewith. The valve stem 30 has a needle valve 31 formed on its lower end for metering the gasoline through the valve 26. The valve stem 30 is connected to the shaft 23 by a lock nut 32 and an adjusting wheel 33 to permit the needle valve 31 to be accurately positioned for controlling the flow of gasoline simultaneously with the control of flow of air to the conduit 17.

In the use and operation of the invention while the engine 11 is operating air is continuously being drawn into the system through conduits 17 after being filtered by the air cleaner 18. The fuel is simultaneously being metered by the valve 26 and is being continuously dumped atop the exposed exhaust 19 within the chamber 16. The gasoline is boiled by heat from the exhaust pipe 19 and is forced away from the heating surface and is forced to rise by the boiling fuel beneath it until it comes into the air stream in the upper portion of the chamber 16 where it is drawn through the conduit 15 into the intake manifold 13 and thus into the cylinders of the internal combustion engine 11. The spent charge from the engine 11 is then funneled out to the exhaust manifold 12 and into the exhaust pipe 19 through the chamber 16 to heat additional incoming liquid gasoline or other fuel before being finally directed out to the conventional exhaust system of the motor vehicle.

By heating only the gasoline there is no great change in volumetric ratios which occur when the gasoline and air mixture is heated.

In FIG. 6 a modified system is indicated generally at 110 and includes a chamber 116 having a conduit 115 and a conduit 117 extending integrally from opposite sides thereof. An exhaust pipe 119 extends through the chamber 116 in sealed relation therein all in the same manner as in the form of the invention illustrated in FIGS. 1 through 5. A fuel line 121 extends into the chamber 116 to direct fuel onto the hot exhaust pipe 119 so that the fuel will become gasified prior to mixing with air. Metering valve 126 in the fuel line 121 is controlled by a shaft 123 which also controls a valve disk 124 and a water metering valve 140. A water line 141 extends to a water injector jet 142 connected by a fitting 143 into the side wall of the conduit 115. A vacuum line 144 is connected by a fitting 145 into the conduit 115. The water metering valve 140 is supported on a bracket 127 identical to the bracket 27.

In the use and operation of the invention illustrated in FIGS. 6 through 8 with the exception of the water injection the operation is identical to that of the form of the invention illustrated in FIGS. 1 through 5. With the air and fuel valve adjusted to give the proper ratio a water metering valve 140 is also similarly adjusted to meter water through the water line 141 and through the jet 142 into the conduit 115 so as to provide the water content for the fuel air mixture to increase its octane rating.

In FIG. 9 the reference numeral 210 indicates generally a modified form of fuel system constructed in accordance with the invention.

In the form of the invention illustrated in 210 the valve 224 is identical to the valve 124 but is located in the conduit 215 on the engine side of the chamber 216 rather than in the conduit 217 on the opposite side of the chamber 216. The exhaust pipe 219 extends through the chamber 216 in the same manner as for the other forms of the invention.

Metering fuel valve 226 and metering water valve 240 are actuated in the same manner as in the form of the invention illustrated in FIGS. 6 through 8 with the positioning of the disk valve 224 being the soul difference.

In the use and operation of the invention illustrated in FIG. 9 it is identical to that of the form of the invention illustrated in FIGS. 6 through 8.

The system of the present invention treats the liquid fuel separately from the air and then mixes the treated fuel and air for feeding to the combustion chambers of the engine.

Formally devices were designed to heat the air and liquid fuel mixture together so that a great quantity of cooling air was directed against any heated surface making it extremely difficult to vaporize the fuel elements on such surfaces. In the present invention all of the fuel is impinged upon the exhaust heated surface prior to exposure to fast flowing air on its way to the combustion chamber. The heating of the fuel separately from the air avoids the lowering of the volumetric efficiency of the engine which occurs when both the air and fuel charge are heated as a unit.

When the engine is first started while cold it is obvious that there is no high exhaust temperature to heat the fuel, but the fuel itself has different mixtures of volatile fuels within it. In other words a certain percentage of the fuel will gasify of its own accord at the starting temperature. This partial self gasing of the fuel at the starting temperature is what is used to start the engine while that is happening the not so volatile parts of the fuel are accumulating at the bottom of the chamber and are thus prevented from entering the combustion chamber in a liquid state.

After the engine is started and operating it begins to heat the exhaust pipe extending through the chamber and excess fuel pooled at the bottom of the chamber will be gradually boiled away as the exhaust pipe temperature increases. While this is occurring it will temporarily enrich the mixture with the ideal air to fuel ratio being reached in a period of from 10 to 60 seconds after the engine has started.

Having thus described the preferred embodiment of the invention it should be understood that numerous structural modifications and adaptations may be resorted to without departing from the spirit of the invention.

What is claimed is:

1. A fuel system for internal combustion engines comprising an exhaust pipe extending from said internal combustion engine, a chamber, said exhaust pipe extending through said chamber with said chamber sealed to said exhaust pipe, a hollow tube extending into said chamber and having an open end directed toward said exhaust pipe for directing liquid fuel against said exhaust pipe, conduits connected to the upper portion of said chamber for directing a flow of air through said chamber, a baffle extending generally horizontally in said chamber above said hollow tube and below said conduit for concentrating the exhaust pipe heat on the fuel while preventing the flow of air from contacting said exhaust pipe, said baffle being spaced from the sides of said chamber to permit fuel vaporized on said exhaust pipe to rise and mix with the air flowing through said chamber, a liquid fuel control valve connected to said hollow tube, a butterfly valve mounted in the conduit extending to said chamber for controlling the flow of air through said chamber, manually adjustable mechanical means interconnecting said liquid fuel control and said butterfly valves to permit adjustment of the air/fuel ratio provided by said valves, and manually controlled means connected to said mechanical means for simultaneously controlling said valves.

2. A device as claimed in claim 1 wherein said baffle is generally U-shaped in form and extends downwardly on both sides of said exhaust pipe in spaced relation thereto.

\* \* \* \* \*